Patented Sept. 28, 1926.

1,601,406

UNITED STATES PATENT OFFICE.

HERBERT RAYMOND MOODY, OF NEW YORK, N. Y.

HYDROGENATION AND PRODUCTION OF NONSLUDGING OILS.

No Drawing.    Application filed May 28, 1923. Serial No. 642,083.

This invention relates to the treatment of unsaturated organic bodies and more particularly relates to the treatment of petroleum fractions having definite electrical, mechanical and chemical properties in order to render them non-sludging. This application is a continuation in part of my application filed February 6, 1918, Serial No. 215,715 which issued as Patent No. 1472882 November 6, 1923.

In oils, such as are used, for example, in electrical apparatus for insulating and cooling, for lubrication in various forms of electrical and mechanical apparatus, or for the transference of heat, it is important that the oils should not sludge during service. The ordinary methods of purifying such petroleum fractions as are used for these purposes do not free them from sludge-forming constituents, and upon use, especially under conditions where they are subjected to heat and to oxidation, a sludge of objectionable nature frequently forms in such oils.

Among the objects of the present invention are to provide new methods of hydrogenating organic bodies and to impart to oils which tend to form sludges improved properties and qualities which adapt them particularly for use for such purposes as those noted above.

According to the present invention, the oil, such as a petroleum fraction of appropriate characteristics, adapted for the intended purpose, after proper fractionation, filtration, or other clarification treatment, is subjected to treatment with aluminum chloride or similarly acting salts, such as ferric or zinc or cuprous chloride and aluminum carbide or other carbide forming hydrogen with the salt, at an appropriate temperature for the reaction. Hydrogen and hydrocarbons are evolved by the reaction. The reactions taking place cannot be definitely described but apparently the hydrogen and hydrocarbons evolved saturate or hydrogenate the unsaturated elements of the oil, rendering them non-sludging. A temperature of between 120° and 150° C. has been found satisfactory for this reaction. As a result of this reaction and treatment the oil can be freed from its propensity to sludge and converted into an oil which yields no sludge. In some cases the oil may require repeated treatment, but this is seldom necessary.

During reaction the two reagents should be maintained well mixed and in intimate contact with the oil or organic liquid being treated. The reagents may be suspended in the oil or the oil may be brought into contact with a confined mass of the reagents. While the reaction is satisfactory at a temperature between 120 and 150° C. higher temperatures cut down the time required and permit the use of smaller amounts of reagents. The time required for the reaction is usually from 2 to 5 hours, although it should be determined with each quality of oil treated. This is also true of the temperature. A satisfactory proportion of salt and of carbide is usually about 5% of each on the oil treated. At the end of the process the undesirable products of the reaction can be removed by settling, by filtering, by washing, or otherwise. The separation of such materials is essential where their presence would be detrimental in the treated oil, for example, where their presence would decrease the electrical resistance of oil intended for insulating purposes. The oil is thus obtained free from the reagents with which it has been treated and free also by the treatment from sludge-forming constituents.

In some cases it has been found desirable to subject the oils being treated to a preliminary purification by heating them with material such as bone charcoal, fuller's earth, ferric oxide, or similar clarifying substances, or mixtures thereof. The hydrogenation of the unsaturated body can be supplemented by the introduction of hydrogen from any suitable external source during the reaction. The injection of hydrogen in this manner will also assist in agitating the material under treatment during the reaction. The reaction may be carried out at cracking or decomposition temperatures, but for the production of non-sludging oils for electrical or lubricating purposes it is preferably carried out below the temperature at which cracking or decomposition takes place.

The invention will be further illustrated by the following more detailed description of a specific embodiment thereof.

A petroleum fraction of appropriate characteristics such as viscosity, flash point, etc., is selected and subjected to a preliminary purification by heating with a mixture of 6 parts bone charcoal or similar clarifying substance, 7 to 9 parts of fuller's earth or similar material, and 2 parts of ferric oxide per 100 parts of oil. The clarifying material may be removed by filtration and the treatment may be repeated as many times as is necessary or desirable with fresh charges of clarifying material.

The oil is then agitated with about 5 parts of aluminum chloride and 5 parts of aluminum carbide per 100 parts of oil, in a suitable receptacle which may be provided with a steam jacket or other heating means and with an agitator or stirrer for causing the agitation of the oil. The mixture is continuously agitated and maintained at a temperature between 120° and 150° C. until the reaction is complete or has been carried to the desired extent. The temperature should be maintained approximately constant until the desired reaction has been effected.

It will be apparent that the novel method of the present invention can be applied to other unsaturated bodies besides those of petroleum fractions and petroleum fractions containing sludge-forming constituents, although the invention is of particular advantage when applied to such petroleum oils. Such petroleum oil fractions which are otherwise unsatisfactory for certain electrical and mechanical uses, because of their sludging propensities, can be thus made practically non-sludging, and can be thus made available for employment in the industries. Among the other unsaturated bodies which can be similarly improved or hydrogenated, may be mentioned unsaturated hydrocarbons other than those of petroleum fractions, unsaturated animal and vegetable oils and fats such as the fatty acids and their glycerides, etc.

It will thus be seen that this invention provides a new and advantageous method of hydrogenating unsaturated organic bodies and new and advantageous methods of rendering sludge-forming oils substantially non-sludging.

I claim:

1. A method of hydrogenating unsaturated organic bodies forming addition products with hydrogen which comprises treating the same with a carbide and a salt reacting therewith in the presence of organic compounds containing hydrogen to form hydrogen, substantially as described.

2. A method of hydrogenating unsaturated organic bodies forming addition products with hydrogen which comprises treating the same with aluminum carbide and a salt reacting therewith in the presence of organic compounds containing hydrogen to form hydrogen, substantially as described.

3. A method of hydrogenating unsaturated organic bodies forming addition products with hydrogen which comprises treating the same with aluminum carbide and a metallic chloride reacting therewith in the presence of organic compounds containing hydrogen to form hydrogen, substantially as described.

4. A method of hydrogenating unsaturated organic bodies forming addition products with hydrogen which comprises treating the same with aluminum carbide and aluminum chloride at an elevated temperature, substantially as described.

5. A method of hydrogenating unsaturated organic bodies forming addition products with hydrogen which comprises treating the same with aluminum carbide and aluminum chloride at a temperature between about 120° and 150° C.

6. A method of treating sludge-forming oil to render sludge-forming constituents thereof non-sludging, which comprises treating the same with aluminum carbide and aluminum chloride at an elevated temperature, substantially as described.

7. A method of treating sludge-forming oil to render sludge-forming constituents thereof non-sludging, which comprises treating the same with aluminum carbide and aluminum chloride at a temperature between about 120° and 150° C.

8. A method of treating sludge-forming oil to render sludge-forming constituents thereof non-sludging, which comprises treating the same with about 5 parts of aluminum carbide and about 5 parts of aluminum chloride per 100 parts of oil, at an elevated temperature, substantially as described.

9. A method of treating sludge-forming oil to render sludge-forming constituents thereof non-sludging which comprises continuously agitating the same with a mixture of carbide and a salt reacting therewith in the presence of the oil to form hydrogen at an elevated temperature, substantially as described.

In testimony whereof I affix my signature.

HERBERT RAYMOND MOODY.